United States Patent
Seow et al.

(10) Patent No.: US 9,111,353 B2
(45) Date of Patent: Aug. 18, 2015

(54) ADAPTIVE ILLUMINANCE FILTER IN A VIDEO ANALYSIS SYSTEM

(71) Applicant: BEHAVIORAL RECOGNITION SYSTEMS, Inc., Houston, TX (US)

(72) Inventors: Ming-Jung Seow, Houston, TX (US); Tao Yang, Katy, TX (US); Wesley Kenneth Cobb, The Woodlands, TX (US)

(73) Assignee: BEHAVIORAL RECOGNITION SYSTEMS, INC., Houston, TX (US)

( * ) Notice: Subject to any disclaimer, the term of this patent is extended or adjusted under 35 U.S.C. 154(b) by 85 days.

(21) Appl. No.: 13/930,276

(22) Filed: Jun. 28, 2013

(65) Prior Publication Data

US 2014/0003720 A1    Jan. 2, 2014

Related U.S. Application Data

(60) Provisional application No. 61/666,524, filed on Jun. 29, 2012.

(51) Int. Cl.
*G06K 9/46* (2006.01)
*H04N 9/74* (2006.01)
(Continued)

(52) U.S. Cl.
CPC .......... *G06T 7/0079* (2013.01); *G06K 9/00771* (2013.01); *G06T 7/2053* (2013.01);
(Continued)

(58) Field of Classification Search
CPC ................ G06T 7/0079; G06T 7/2053; G06T 2207/10016; G06T 2207/20081; G06T 2207/30232; G06T 2207/10024; G06T 2207/20084

USPC ......... 382/173, 100, 103, 106, 107, 155, 162, 382/168, 181, 193, 199, 209, 218, 219, 224, 382/232, 254, 274, 276, 282, 286–294, 305, 382/312, 190; 707/791; 340/573.1, 948; 348/586, 155, 152, 153, 169, 587, 348/221.1, 208.4, E5.058
See application file for complete search history.

(56) References Cited

U.S. PATENT DOCUMENTS

| 4,679,077 A | 7/1987 | Yuasa et al. |
| 5,113,507 A | 5/1992 | Jaeckel |

(Continued)

FOREIGN PATENT DOCUMENTS

WO    2009049314 A2    4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Sheela Chawan
(74) *Attorney, Agent, or Firm* — Patterson & Sheridan LLP (57) ABSTRACT

Techniques are disclosed for removing false-positive foreground pixels resulting from environmental illumination effects. The techniques include receiving a foreground image and a background model, and determining an approximated reflectance component of the foreground image based on the foreground image itself and a background model image which is used as a proxy for an illuminance component of the foreground image. Pixels of the foreground image having approximated reflectance values less than a threshold value may be classified as false-positive foreground pixels and removed from the foreground image. Further, the threshold value used may be adjusted based on various factors to account for, e.g., different illumination conditions indoors and outdoors.

20 Claims, 4 Drawing Sheets

(51) Int. Cl.
*G06T 7/00* (2006.01)
*G06K 9/00* (2006.01)
*G06T 7/20* (2006.01)

(52) U.S. Cl.
CPC .......... *G06T 2207/10016* (2013.01); *G06T 2207/10024* (2013.01); *G06T 2207/20081* (2013.01); *G06T 2207/20084* (2013.01); *G06T 2207/30232* (2013.01)

(56) References Cited

U.S. PATENT DOCUMENTS

| | | | |
|---|---|---|---|
| 5,748,775 | A | 5/1998 | Tsuchikawa et al. |
| 5,751,378 | A | 5/1998 | Chen et al. |
| 5,969,755 | A | 10/1999 | Courtney |
| 6,252,974 | B1 | 6/2001 | Martens et al. |
| 6,263,088 | B1 | 7/2001 | Crabtree et al. |
| 6,570,608 | B1 | 5/2003 | Tserng |
| 6,661,918 | B1 | 12/2003 | Gordon et al. |
| 6,674,877 | B1 | 1/2004 | Jojic et al. |
| 6,678,413 | B1 | 1/2004 | Liang et al. |
| 6,856,249 | B2 | 2/2005 | Strubbe et al. |
| 6,940,998 | B2 | 9/2005 | Garoutte |
| 7,076,102 | B2 | 7/2006 | Lin et al. |
| 7,136,525 | B1 | 11/2006 | Toyama et al. |
| 7,158,680 | B2 | 1/2007 | Pace |
| 7,200,266 | B2 | 4/2007 | Ozer et al. |
| 7,227,893 | B1 | 6/2007 | Srinivasa et al. |
| 7,436,887 | B2 | 10/2008 | Yeredor et al. |
| 7,825,954 | B2 | 11/2010 | Zhang et al. |
| 7,868,912 | B2 | 1/2011 | Venetianer et al. |
| 8,218,819 | B2 * | 7/2012 | Cobb et al. ............ 382/103 |
| 8,611,728 | B2 * | 12/2013 | Bhagavathy et al. ........ 386/282 |
| 2003/0107650 | A1 | 6/2003 | Colmenarez et al. |
| 2003/0228058 | A1 | 12/2003 | Xie et al. |
| 2004/0032906 | A1 * | 2/2004 | Lillig .................. 375/240.08 |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0138338 | A1 | 6/2006 | Tezuka et al. |
| 2006/0165386 | A1 | 7/2006 | Garoutte |
| 2006/0190419 | A1 | 8/2006 | Bunn et al. |
| 2006/0193516 | A1 | 8/2006 | Toyama et al. |
| 2006/0222206 | A1 | 10/2006 | Garoutte |
| 2007/0250898 | A1 | 10/2007 | Scanlon et al. |
| 2008/0002856 | A1 | 1/2008 | Ma et al. |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0247599 | A1 | 10/2008 | Porikli et al. |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |
| 2010/0150471 | A1 | 6/2010 | Cobb et al. |
| 2010/0322516 | A1 | 12/2010 | Xu et al. |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

ADAPTIVE ILLUMINANCE FILTER IN A VIDEO ANALYSIS SYSTEM

CROSS-REFERENCE TO RELATED APPLICATIONS

This application claims priority to U.S. provisional application having Ser. No. 61/666,524, filed on Jun. 29, 2012, which is hereby incorporated by reference in its entirety.

BACKGROUND OF THE INVENTION

1. Field of the Invention

Embodiments of the invention provide techniques for analyzing a sequence of video frames. More particularly, to analyzing and learning behavior based on streaming video data while filtering out environmental illumination effects.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event).

Environmental illumination changes can negatively affect a video surveillance system's ability to accurately distinguish foreground objects. Such changes may include, but are not limited to, clouds blocking the sunlight, shadows cast by objects during daytime, shadows and highlights caused by lumination fluctuations due to lack of ambient light, and shadows due to artificial light sources at night. In general, these shadows and highlights resulting from environmental illumination changes may be mistaken as foreground where the shadows and highlights differ in appearance from a background model image which depicts learned scene background. That is, the video surveillance system may generate false-positives by misclassifying pixels of shadows and/or highlights as foreground pixels.

Some conventional video surveillance systems suppress effects of environmental illumination based on the assumption that false-positive foreground pixels which represent shadows and highlights differ from their corresponding background pixels only in luminance, but not chromaticity, values. Such systems may classify foreground pixels having similar chromaticity but higher or lower luminance values than corresponding background pixels as false-positive foreground pixels. However, experience has shown that this approach may itself generate false-positives and false-negatives by incorrectly finding foreground pixels to be background pixels, and vice versa. Such false-positives may cause the system to erroneously remove pixels of foreground objects from the foreground pixels. Conversely, such false-negatives may cause the system to keep shadow and/or highlight pixels as foreground pixels.

SUMMARY OF THE INVENTION

One embodiment provides a method for removing false-positive foreground pixels resulting from environmental illumination effects from a video frame. The method includes extracting a foreground image which includes pixels of foreground patches from the video frame using a background model image and determining, based on at least the foreground image and the background model image used as a proxy for an illuminance component of the foreground image, an approximated reflectance component of the foreground image, where the approximated reflectance component provides approximated reflectance values for respective pixels in the foreground image. The method further includes removing from the foreground image pixels having approximated reflectance values less than a threshold.

Other embodiments include a computer-readable medium that includes instructions that enable a processing unit to implement one or more embodiments of the disclosed method as well as a system configured to implement one or more embodiments of the disclosed method.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide a techniques for analyzing and learning behavior based on an acquired stream of video frames. A machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In addition, the computer vision engine may include a background/foreground (BG/FG) component which is configured to remove false-positive foreground pixels resulting from environmental illumination effects. The BG/FG component may determine a foreground image (e.g., an image including pixels of the scene foreground and pixel value 0 elsewhere) of a current video frame and generate a background model image (e.g., an image including pixels having values equal to the average of the pixel values of scene background in a plurality of previous video frames) based on received video frames, as discussed above. In order to remove false-positive foreground pixels resulting from environmental illumination effects, the BG/FG component may determine an approximated reflectance component of the foreground image and remove pixels of the foreground image having approximated reflectance values less than (or greater than, depending on the implementation) a threshold value.

As used herein, "illuminance" of an image refers to the component of the image resulting from environmental lighting conditions, while "reflectance" refers to the component of the image resulting from light reflecting off of objects in the scene. Illuminance and reflectance may be determined on a per-pixel basis. That is, each pixel may have a corresponding illuminance value and reflectance value in the illuminance and reflectance components of the image, respectively.

Generally, illuminance may change over time as lighting conditions in the environment change. For example, a cloud passing overhead may cast a shadow which makes part of the image darker. By contrast, reflectance may tend to remain constant over time, because the reflection of light from objects depends on inherent properties of the objects, which may not change rapidly. In general, the illuminance component of an image may include a low frequency part of the Fourier spectrum while the reflectance component of the image may include a high frequency part of the Fourier spectrum.

In one embodiment, the BG/FG component may use portions of the background model image as a proxy for an illuminance component of the foreground image. Under the illuminance-reflectance model, an image may generally be expressed as the product of its illuminance and reflectance components. As a result, the BG/FG component may determine an approximated reflectance component of the foreground image based on the foreground image itself and the portions of the background model image corresponding to pixels of the foreground image and used as a proxy for the illuminance component of the foreground image, as discussed in greater detail below. The BG/FG component may classify pixels of the foreground image having approximated reflectance values less than a threshold value to be false-positive foreground pixels and remove such pixels from the foreground image. Further, the BG/FG component may automatically adjust the threshold value based on various factors to account for, e.g., different illumination conditions indoors and outdoors.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
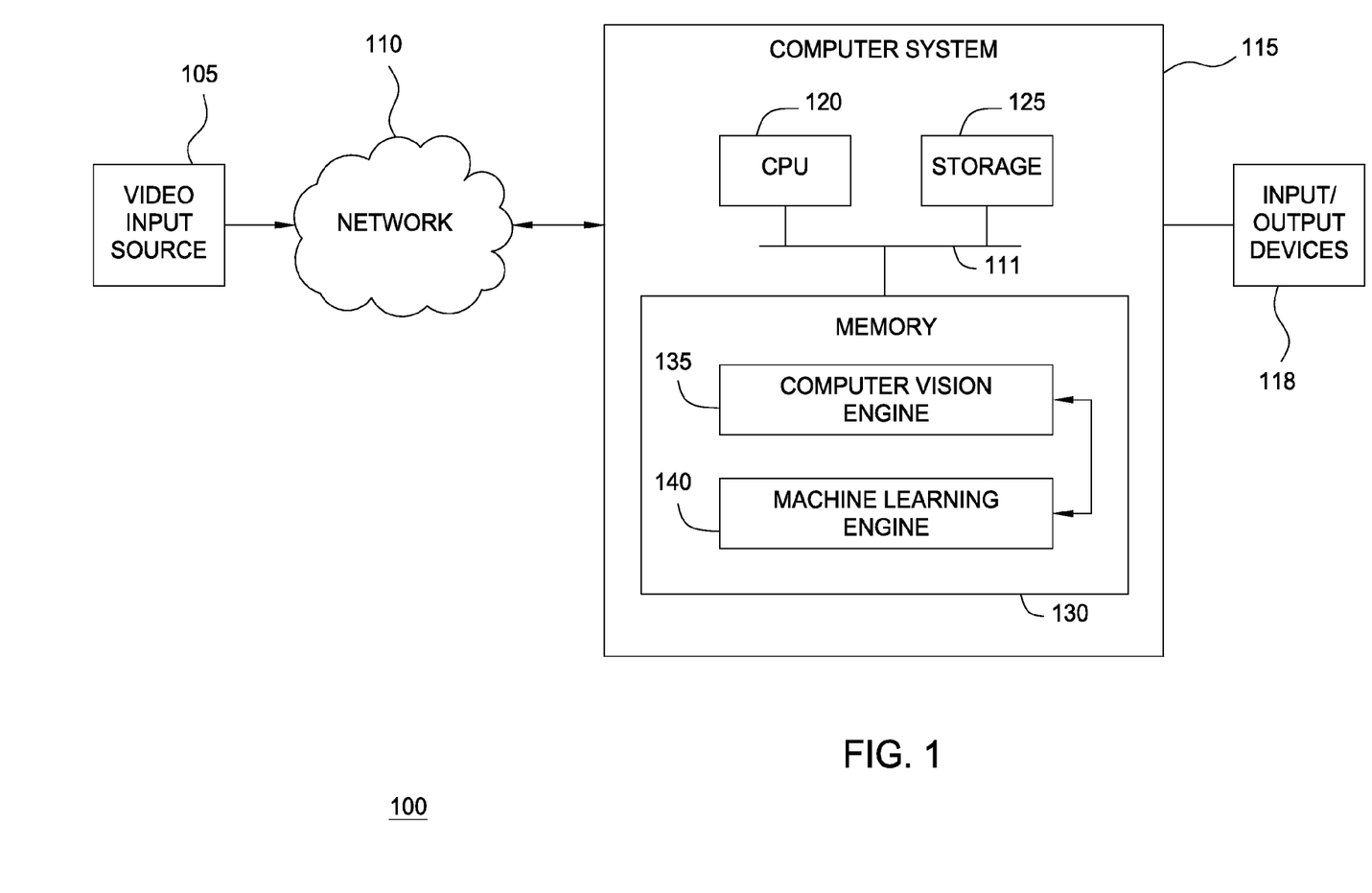
FIG. 1 illustrates components of a video analysis system, according to one embodiment of the invention.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 which includes both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. In particular, the machine learning engine may model the kinematic properties of one or more types of objects.

In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 may analyze each frame in real-time to derive a set of appearance and kinematic data related to objects observed in the frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
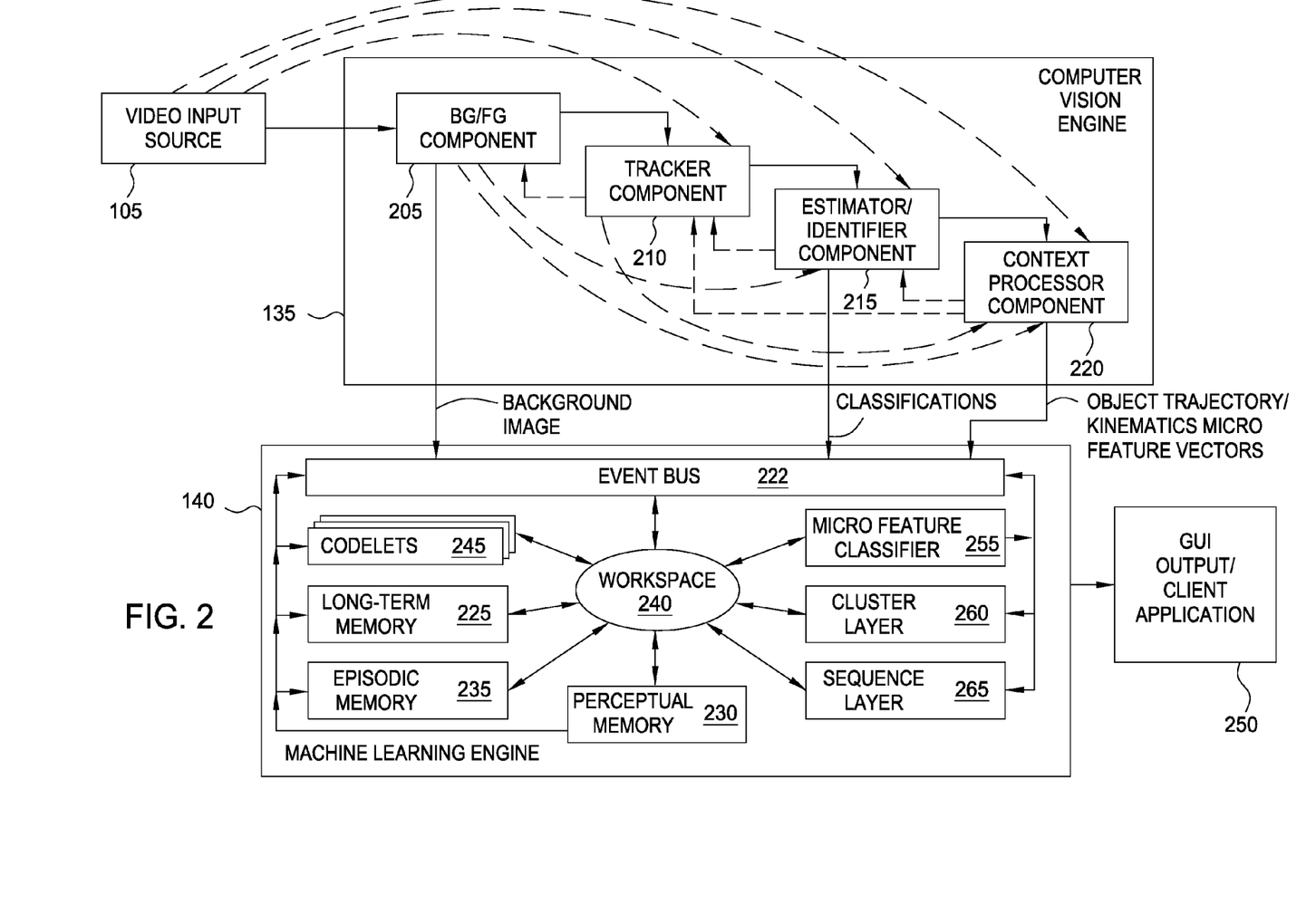
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed).

In one embodiment, the BG/FG component 205 may be configured to separate each frame of video provided by the video input source 105 into a static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Additionally, the BG/FG component 205 may be configured to generate a mask used to identify which pixels of the scene are classified as depicting foreground and, conversely, which pixels are classified as depicting scene background. For example, the mask may provide a black and white image with black pixels indicating image background and white pixels indicating image foreground. The BG/FG component 205 may then extract regions of the image that contain portions of scene foreground (also referred to herein as a foreground "blob" or "patch") using a complement of the mask and the video frame. In particular, the BG/FG component 205 may generate a "foreground image" which includes, for example, pixels of the scene foreground and pixel value 0 elsewhere. Additionally, pixels classified as depicting scene background may be used to update a background image modeling the scene. In one embodiment, the background model image may include pixels having values equal to the average of observed pixel values of scene background in a plurality of previous video frames. Of course, other approaches to distinguish between scene foreground and background, and to generate the foreground and background images, may be used.

In general, the BG/FG component may adapt to relatively gradual changes in the scene by updating the background model to reflect, e.g., the scene background as it appears during various times of the day (e.g., daytime vs. nighttime). However, environmental illumination effects, which occur relatively rapidly, may cause the BG/FG component to incorrectly classify shadows and/or highlights as scene foreground, because the BG/FG component may not adapt quickly enough to such changes. In one embodiment, the BG/FG component may be configured to filter out false-positive foreground pixels resulting from environmental illumination effects by determining an approximated reflectance component of the foreground image and removing pixels of the foreground image having approximated reflectance value less than a threshold value, as discussed in greater detail below. In an alternative embodiment, a module distinct from the BG/FG component may be configured to filter out such false-positive foreground pixels.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and identify a variety of kinematic and/or appearance features of a foreground object, e.g., size, height, width, and area (in pixels), reflectivity, shininess rigidity, speed, velocity, etc.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro-feature vectors and kinematic observations of an object and output this to the machine-learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro-feature classifier 255, a cluster layer 260 and a sequence layer 265. Additionally, the machine-learning engine 140 includes a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different event streams from the event bus 222. For example, the micro-feature classifier 255 may subscribe to receive the micro-feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. Each codelet 245 may be a software program configured to evaluate different sequences of events and to determine how one sequence may follow (or otherwise relate to) another (e.g., a finite state machine). More generally, each codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related to an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles in certain areas of the scene tend to be in motion," "vehicles tend to stop in certain areas of the scene," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro-feature classifier 255 may schedule a codelet 245 to evaluate the micro-feature vectors output by the computer vision engine 135. As noted, the computer vision engine 135 may track objects frame-to-frame and generate micro-feature vectors for each foreground object at a rate of, e.g., 5 Hz. In one embodiment, the micro-feature classifier 255 may be configured to create clusters from this stream of micro-feature vectors. For example, each micro-feature vector may be supplied to an input layer of the ART network (or a combination of a self organizing map (SOM) and ART network used to cluster nodes in the SOM). In response, the ART network maps the micro-feature vector to a cluster in the ART network and updates that cluster (or creates a new cluster if the input micro-feature vector is sufficiently dissimilar to the existing clusters). Each cluster is presumed to represent a distinct object type, and objects sharing similar micro-feature vectors (as determined using the choice and vigilance parameters of the ART network) may map to the same cluster.

For example, the micro-features associated with observations of many different vehicles may be similar enough to map to the same cluster (or group of clusters). At the same time, observations of many different people may map to a different cluster (or group of clusters) than the vehicles cluster. Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro-feature classifier 255 may assign an object type identifier to each cluster, providing a different object type for each cluster in the ART network.

In an alternative embodiment, rather than generate clusters from the micro-features vector directly, the micro-feature classifier 255 may supply the micro-feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As shown, the machine-learning engine 140 also includes a cluster layer 260 and a sequence layer 265. As described in greater detail below, the cluster layer 260 may be configured to generate clusters from the trajectories of objects classified by the micro-feature classifier 255 as being an instance of a common object type. In one embodiment, the cluster layer 260 uses a combination of a self-organizing map (SOM) and an ART network to cluster the kinematic data in the trajectories. Once the trajectories are clustered, the sequence layer 265 may be configured to generate sequences encoding the observed patterns of behavior represented by the trajectories. And once generated, the sequence layer may identify segments within a sequence using a voting experts technique. Further, the sequence layer 265 may be configured to identify anomalous segments and sequences.

In addition to the learning process discussed above, embodiments may be configured to filter out environmental illumination effects to produce more accurate foreground images, as discussed in greater detail below.

Filtering Illumination Effects in a Machine-Learning Video Analytics System

As noted above, a machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In addition, the computer vision engine may include a BG/FG component which is configured to remove false-positive foreground pixels resulting from environmental illumination effects. The BG/FG component may determine a foreground image (e.g., an image including pixels of the scene foreground and pixel value 0 elsewhere) of a current video frame and generate a background model image (e.g., an image including pixels having values equal to the average of the pixel values of scene background in a plurality of previous video frames) based on received video frames, as discussed above. In order to remove false-positive foreground pixels resulting from environmental illumination effects, the BG/FG component may determine an approximated reflectance component of the foreground image and remove pixels of the foreground image having approximated reflectance values less than (or greater than, depending on the implementation) a threshold value.

Generally, illuminance may change over time as lighting conditions in the environment change. For example, a cloud passing overhead may cast a shadow which makes part of the image darker. By contrast, reflectance may tend to remain constant over time, because the reflection of light from objects depends on inherent properties of the objects, which may not change rapidly. In general, the illuminance component of an image may include a low frequency part of the Fourier spectrum while the reflectance component of the image may include a high frequency part of the Fourier spectrum.

In one embodiment, the BG/FG component may use portions of the background model image as a proxy for an illuminance component of the foreground image. Under the illuminance-reflectance model, an image may generally be expressed as the product of its illuminance and reflectance components. As a result, the BG/FG component may determine an approximated reflectance component of the foreground image based on the foreground image itself and the portions of the background model image corresponding to pixels of the foreground image and used as a proxy for the illuminance component of the foreground image, as discussed in greater detail below. The BG/FG component may classify pixels of the foreground image having approximated reflectance values less than a threshold value to be false-positive foreground pixels and remove such pixels from the foreground image. Further, the BG/FG component may automatically adjust the threshold value based on various factors to account for, e.g., different illumination conditions indoors and outdoors.

Figure 3:
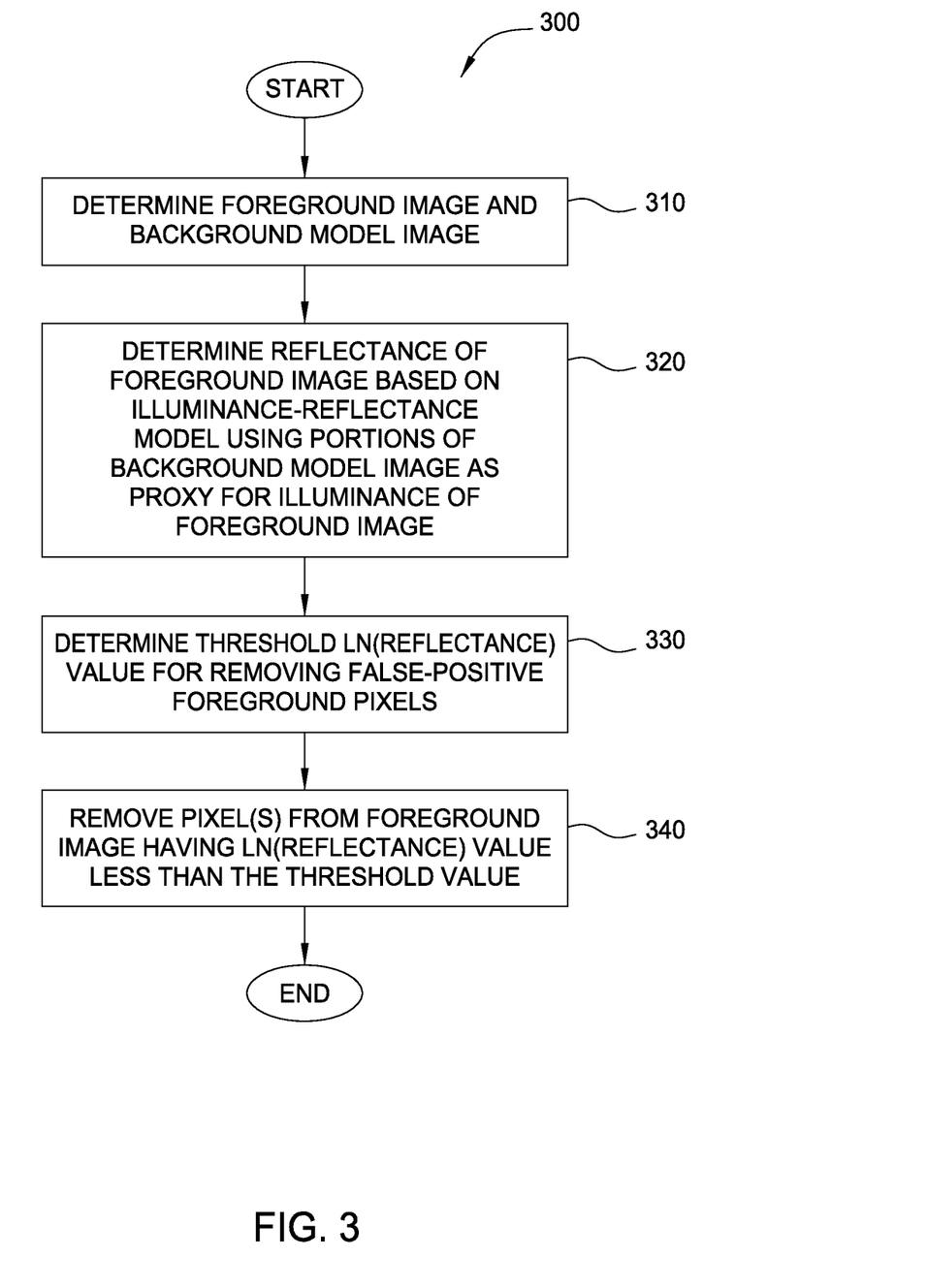
FIG. 3 illustrates a method for filtering out false-positive foreground pixels resulting from environmental illumination effects, according to one embodiment of the invention.

FIG. 3 illustrates a method for filtering out false-positive foreground pixels resulting from environmental illumination effects, according to one embodiment. As shown, the method 300 begins at step 310, where a BG/FG component determines a foreground image and a background model image from a video frame. As discussed, the BG/FG component of the computer vision engine may separate a current video frame provided by a video input source into a static part (the scene "background) and a collection of volatile parts (the scene "foreground") using a background model. In one embodiment, the BG/FG component may model background states for each pixel using per-pixel ART networks, each of which models a given pixel, and such background states may be used to distinguish foreground and background pixels. The BG/FG component may extract regions of the image that contain portions of scene foreground (also referred to herein as a foreground "blob" or "patch") to generate a foreground image, as discussed above. Additionally, pixels classified as depicting scene background may be used to generate a background model image. Of course, other approaches to distinguish between scene foreground and background, and to generate the foreground image and background model image, may be used.

At step 320, the BG/FG component determines an approximated reflectance of the foreground image based on the illuminance-reflectance model using portions of the background model image corresponding to pixels of the foreground image as a proxy for illuminance of the foreground image. As discussed, under the illuminance-reflectance model, an image $f(x,y)$ may be expressed as the product of its illuminance $i(x,y)$ and reflectance $r(x,y)$ components:

$$f(x,y)=i(x,y)r(x,y) \quad (1)$$

The foregoing product may be converted to a sum by taking the natural log of both sides of equation (1), thereby separating linearly in the frequency spectrum the illuminance and reflectance components:

$$\ln(f(x,y))=\ln(i(x,y))+\ln(r(x,y)) \quad (2)$$

In one embodiment, portions of the background model image (not updated based on the current video frame) which correspond to pixels of the foreground image b(x,y) may be used as a proxy for the illuminance component of the foreground image. In general, the illuminance and reflectance components of an image are difficult to compute, and may take a great amount of time to determine. However, experience has shown that portions of the background model image b(x,y) may be used as an approximation of the illuminance component i(x,y) of the foreground image, because the background model image may correspond roughly to low-frequency parts of the foreground image which do not change rapidly. As a result, an approximated reflectance component of the foreground image may be determined using the following equation:

$$\ln(r(x,y)) = \ln(f(x,y)) - \ln(b(x,y)) \quad (3)$$

In one embodiment, the foreground image f(x,y) and background image portions b(x,y) of equation (3) may be in grayscale. In such a case, the BG/FG component may first convert the foreground image and background model image received at step 310 to grayscale images, if necessary, and then determine the reflectance component of the grayscale foreground image.

At step 330, the BG/FG component determines a threshold ln(r(x,y)) value for removing false-positive foreground pixels. As discussed, the "reflectance" component of an image may generally result from light reflecting off of objects in the scene. As a result, pixels tend to have higher approximated reflectance values r(x,y), and therefore higher ln(r(x,y)) values, if they represent part of an actual foreground object from which light may reflect, and vice versa. Where the approximated ln(reflectance) value of a foreground pixel is particularly low (e.g., at or below a threshold), the BG/FG component may classify the pixel as a false-positive foreground pixel (i.e., a foreground pixel which is actually part of the background). That is, the BG/FG component may classify all pixels for which $|\ln(r(x,y))| > T$ as foreground pixels, and all pixels for which $|\ln(r(x,y))| \leq T$ as background pixels, where T is a threshold value.

Although discussed above with respect to a threshold for natural log of the approximated reflectance value, in alternative embodiments a threshold may instead be set for, e.g., the approximated reflectance value itself, as opposed to ln(reflectance).

Experience has shown that environmental illumination effects that cause false-positive foreground pixels are more prevalent in indoor than outdoor settings. As the result, the threshold ln(r(x,y)) value may generally be set higher for indoor environments so that pixels having larger reflectance values which nevertheless resulted from environmental illumination effects may be removed from the foreground image. That is, in general, $T_i > T_o$, where $T_i$ is an indoor threshold value and $T_o$ is an outdoor threshold value.

In one embodiment, the threshold value may simply be a predefined constant value. In an alternative embodiment, the BG/FG component may determine a threshold value which accounts for the type of environment (e.g., indoor vs. outdoor) observed. The BG/FG component may make such a determination using counts of static foreground pixel for the current video frame and a preceding video frame (e.g., the last video frame), as well as counts of dynamic foreground pixel for the current video frame and the preceding video frame. As used herein, static pixels are pixels whose values have not changed, or have changed less than a threshold value, from a previous frame (e.g., the last frame) to the current frame. For example, the static foreground pixel count for the current frame may include all pixels representing foreground objects which have remained stationary in the scene. By contrast, dynamic foreground pixels are pixels whose values have changed from a previous frame (e.g., the last frame) to the current frame.

The BG/FG component may determine, using the static and foreground pixel counts discussed above, a noise level for the current video frame. In one embodiment, the noise level may be initialized based on the total current frame foreground pixel count (including both static and dynamic pixels) over the total previous frame foreground pixel count. If there are more total current foreground pixels than previous foreground pixels, it may be indicative of noise (i.e., false-positive foreground pixels) in the current video frame.

However, a change in the count of foreground pixels is also consistent with new foreground object(s) appearing in the scene. As a result, the noise level may be adjusted from its initialized value, discussed above, to account for the counts of dynamic foreground pixels in the current and previous frames. For example, if the count of total current foreground pixels is larger than the count of total previous foreground pixels, but no such change is observed in the count of dynamic pixels, this may indicate the presence of noise in the current frame, because foreground pixels may have appeared without foreground objects having moved into the scene. Alternatively, the initialized value of the noise level may be further adjusted to account for the change in count of static pixels in the previous frame and in the current frame, as compared to the change in count of dynamic pixels. Similar to the discussion above, if the change in the count of static pixels is high compared to the change in the count of dynamic pixels, this may indicate the presence of noise in the current frame, because foreground pixels may have appeared without foreground objects having moved into the scene. In a further embodiment, the larger of the foregoing adjustments of the noise level from its initialized value may be used. Additional examples of an approach for auto tuning the thresholds used by the luminance filter are shown in the attached appendices.

In general, greater noise may be expected in indoor, as opposed to outdoor, environments as a result of illumination changes. As a result, the noise level may be used to indicate, for example, one of the following ln(r(x,y)) threshold settings:

disabled (i.e., filtering of illumination effects is turned off)
outdoor enhance
outdoor aggressive (i.e., aggressive illuminance filtering for outdoor environments),
indoor regular,
indoor aggressive,
indoor extreme.

As discussed, the threshold value(s) for indoor environments may generally be set higher than the threshold value(s) for outdoor environments, because illumination changes and their effects may be more prevalent in indoor environments. For example, the settings just discussed may be associated with ln(r(x,y)) threshold values which are ordered as follows: outdoor enhance threshold<outdoor aggressive threshold<indoor regular threshold<indoor aggressive threshold<indoor extreme threshold. In addition, a non-zero amount of noise may be expected at nearly all times. As a result, the filtering of illumination effects may be disabled if the noise level is below a threshold value (e.g., below the noise level associated with the "outdoor enhance" setting). Of course, the different threshold settings for how aggressive the illuminance filter is in reclassifying foreground pixels as background (based on presumed changes in illuminance) may be tailored to suit the needs of a particular case.

At step 340, the BG/FG component removes pixel(s) from the foreground image which have approximated reflectance value less than the threshold value. As discussed, the BG/FG component may be configured to return a approximated reflectance component of the foreground image. If the approximated reflectance value (or, equivalently, the natural log of the approximated reflectance) for any given pixel of the foreground image is below (or above, depending on the implementation) the threshold value, it may indicate that the pixel is a false-positive foreground pixel (i.e., that the pixel is actually part of the background). The BG/FG component may remove such pixels from the foreground image to produce a modified foreground image that better represents actual foreground objects.

Figure 4:
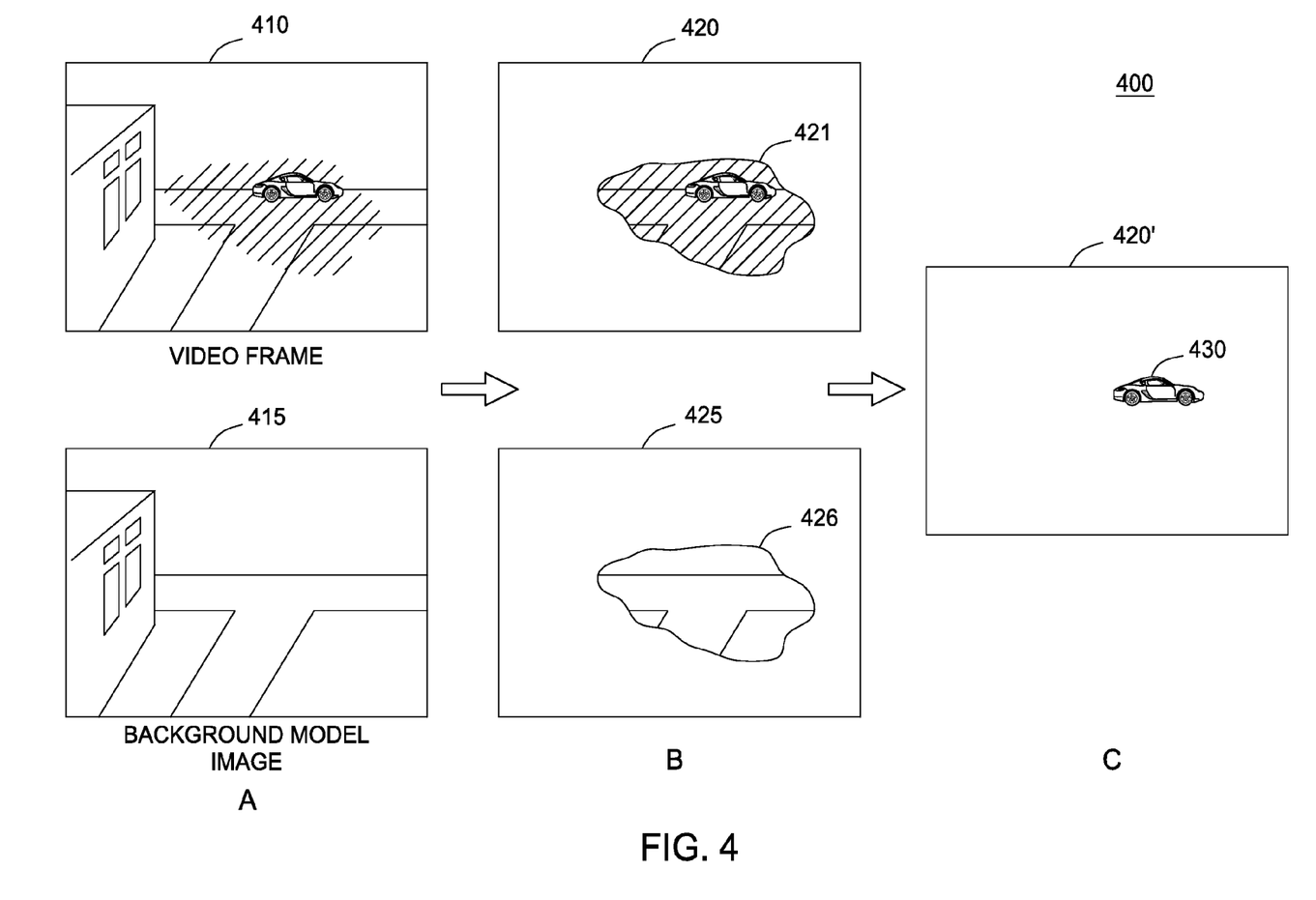
FIG. 4 illustrates false-positive pixels being removed from foreground of an example video frame video frame, according to one embodiment of the invention.

FIG. 4 illustrates false-positive pixels being removed from foreground of an example video frame 410, according to an embodiment. As shown in panel A, the video frame 410 depicts a scene that includes a car and a shadow. The shadow may be cast by, e.g., a passing cloud. Such shadows are an example of environmental illumination effects that may be mistaken for scene foreground.

As discussed, a BG/FG component (not shown) may determine a foreground image 420 which includes pixels of the scene foreground and pixel value 0 elsewhere by comparing the video frame 410 to a background model image 415. For example, the background model image 415 may include pixels having values equal to the average of the pixel values of scene background in a plurality of previous video frames, and the foreground image 420 may be determined by subtracting the background model image 415 from the video frame 410.

As shown, the foreground image 420 includes foreground pixels 421, which depict the car as well as the shadow. The shadow pixels are false-positive foreground pixels, as they result from environmental illumination effects rather than actual objects (e.g., the car) appearing in the scene. To remove such false-positive foreground pixels, the BG/FG component may subtract a natural log of an image 426, which includes pixels 422 of the background model image 415 corresponding to the foreground pixels 421, from the foreground image 420 itself, according to equation (3). Doing so gives an approximation of the natural log of the reflectance component (i.e., (ln(reflectance))) of the foreground image 420.

As discussed, the BG/FG component may further determine a threshold value for ln(reflectance) (or equivalently, for approximated reflectance itself) based on environmental conditions, although predefined threshold value(s) may also be used. In general, the threshold may be set higher for indoor environments and lower for outdoor environments. In one embodiment, the threshold may be determined based on a comparison of counts of static foreground pixels for the video frame 410 and for a preceding video frame and a comparison of counts of dynamic foreground pixels for the video frame 410 and for the preceding video frame, as discussed above.

After obtaining the threshold value for ln(reflectance) (or equivalently, approximated reflectance itself), the BG/FG component may remove pixels from the foreground image 420 that are associated with ln(reflectance) values (or approximated reflectance values) greater than the threshold. Doing so may produce a foreground image 420' in which false-positive foreground pixels depicting the shadow are removed, leaving pixels 430 which better depict actual foreground object(s) such as the car.

While the foregoing is directed to embodiments of the present invention, other and further embodiments of the invention may be devised without departing from the basic scope thereof, and the scope thereof is determined by the claims that follow.

What is claimed is:

1. A computer-implemented method for removing false-positive foreground pixels from a video frame, comprising:
    extracting, via one or more processors, a foreground image from the video frame using a background model image;
    determining, based on at least the foreground image and portions of the background model image used as a proxy for an illuminance component of the foreground image, an approximated reflectance component of the foreground image, wherein the portions of the background image are pixels that correspond to respective pixels in the foreground image and wherein the approximated reflectance component provides approximated reflectance values for the respective pixels in the foreground image; and
    removing from the foreground image pixels having approximated reflectance values less than a first threshold value.

2. The method of claim 1, wherein the approximated reflectance component is determined using $\ln(r(x,y))=\ln(f(x,y))-\ln(b(x,y))$, where $r(x,y)$ is the approximated reflectance component, $f(x,y)$ is the foreground image, and $b(x,y)$ includes pixels of the background model image corresponding to those of the foreground image.

3. The method of claim 1, wherein the first threshold value used is a predefined value for an indoor environment or an outdoor environment, the predefined value being greater for the indoor environment than for the outdoor environment.

4. The method of claim 1, wherein the first threshold value is determined based on a noise level of the video frame.

5. The method of claim 4, wherein the first threshold value is determined based on a comparison of counts of static foreground pixels for the video frame and for a preceding video frame and a comparison of counts of dynamic foreground pixels for the video frame and for the preceding video frame,
    wherein the static foreground pixels are foreground pixels whose values have not changed, or have changed less than a second threshold value, from a previous frame to the video frame, and
    wherein the dynamic foreground pixels are foreground pixels whose values have changed, or have changed more than the second threshold value, from the previous frame to the video frame.

6. The method of claim 4, further comprising, upon determining that the noise level is below a third threshold value, halting the removal of the foreground image pixels.

7. The method of claim 4, wherein the noise level is used to determine one of disabled, outdoor enhance, outdoor aggressive, indoor regular, indoor aggressive, and indoor extreme settings for the first threshold value, and wherein the settings are associated with threshold values ordered as: outdoor enhance threshold<outdoor aggressive threshold<indoor regular threshold<indoor aggressive threshold<indoor extreme threshold.

8. The method of claim 1, wherein the background model image is generated using per-pixel adaptive resonance theory (ART) networks, each ART network modeling a respective pixel.

9. The method of claim 1, further comprising, converting the foreground image and the background model image to grayscale before determining the approximated reflectance component.

10. A non-transitory computer-readable storage medium storing instructions, which when executed by a computer system, perform operations for analyzing a scene depicted in an input stream of video frames captured by a video camera, the operations comprising:

extracting a foreground image from the video frame using a background model image;

determining, based on at least the foreground image and the portions of the background model image used as a proxy for an illuminance component of the foreground image, an approximated reflectance component of the foreground image, wherein the portions of the background image are pixels that correspond to respective pixels in the foreground image and wherein the approximated reflectance component provides approximated reflectance values for the respective pixels in the foreground image; and removing from the foreground image pixels having approximated reflectance values less than a first threshold value.

11. The computer-readable storage medium of claim 10, wherein the approximated reflectance component is determined using $\ln(r(x,y))=\ln(f(x,y))-\ln(b(x,y))$, where $r(x,y)$ is the approximated reflectance component, $f(x,y)$ is the foreground image, and $b(x,y)$ includes pixels of the background model image corresponding to those of the foreground image.

12. The computer-readable storage medium of claim 10, wherein the first threshold value used is a predefined value for an indoor environment or an outdoor environment, the predefined value being greater for the indoor environment than for the outdoor environment.

13. The computer-readable storage medium of claim 10, wherein the first threshold value is determined based on a noise level of the video frame.

14. The computer-readable storage medium of claim 13, wherein the first threshold value is determined based on a comparison of counts of static foreground pixels for the video frame and for a preceding video frame and a comparison of counts of dynamic foreground pixels for the video frame and for the preceding video frame, wherein the static foreground pixels are foreground pixels whose values have not changed, or have changed less than a second threshold value, from a previous frame to the video frame, and wherein the dynamic foreground pixels are foreground pixels whose values have changed, or have changed more than the second threshold value, from the previous frame to the video frame.

15. The computer-readable storage medium of claim 13, the operations further comprising, upon determining that the noise level is below a third threshold value, halting the removal of the foreground image pixels.

16. The computer-readable storage medium of claim 13, wherein the noise level is used to determine one of disabled, outdoor enhance, outdoor aggressive, indoor regular, indoor aggressive, and indoor extreme settings for the first threshold value, and wherein the settings are associated with threshold values ordered as: outdoor enhance threshold<outdoor aggressive threshold<indoor regular threshold<indoor aggressive threshold<indoor extreme threshold.

17. The computer-readable storage medium of claim 10, wherein the background model image is generated using per-pixel adaptive resonance theory (ART) networks, each ART network modeling a respective pixel.

18. The computer-readable storage medium of claim 10, the operations further comprising, converting the foreground image and the background model image to grayscale before determining the approximated reflectance component.

19. A system, comprising:
a processor; and
a memory, wherein the memory includes an application program configured to perform operations for removing false-positive foreground pixels from a video frame, the operations comprising:

extracting a foreground image from the video frame using a background model image, determining, based on at least the foreground image and portions of the background model image used as a proxy for an illuminance component of the foreground image, an approximated reflectance component of the foreground image, wherein the portions of the background image are pixels that correspond to respective pixels in the foreground image and wherein the approximated reflectance component provides approximated reflectance values for the respective pixels in the foreground image, and removing from the foreground image pixels having approximated reflectance values less than a first threshold value.

20. The system of claim 19, wherein the approximated reflectance component is determined using $\ln(r(x,y))=\ln(f(x,y))-\ln(b(x,y))$, where $r(x,y)$ is the approximated reflectance component, $f(x,y)$ is the foreground image, and $b(x,y)$ includes pixels of the background model image corresponding to those of the foreground image.

* * * * *